United States Patent Office

2,943,115
Patented June 28, 1960

2,943,115

PROCESS FOR THE PREPARATION OF ORGANO-MAGNESIUM COMPOUNDS

Henri Normant, Paris, France, assignor to Societe des Usines Chimiques Rhone-Poulenc, Paris, France, a corporation of France No Drawing. Filed Mar. 19, 1958, Ser. No. 722,394

Claims priority, application France Apr. 26, 1957

3 Claims. (Cl. 260—665)

This invention relates to the preparation of organomagnesium compounds.

Organomagnesium compounds are very frequently prepared in a medium of a simple ether, and more especially in diethyl ether. In some cases, however, such ethers only give mediocre yields. This is the case in particular when it is desired to react magnesium with unsaturated compounds of the following types:

(I) Ethylenic compounds characterised by the presence of the group:

I in which X represents a halogen atom e.g. chlorine or bromine, the double bond being situated either in a chain or in a homocyclic or heterocyclic ring.

(II) Acetylenic compounds of the formula:

II in which X represents a halogen atom e.g. chlorine or bromine and R represents an aliphatic or a cyclic group which may be substituted by a functional grouping which does not react with magnesium compounds.

It is known that compounds of the type of Formula I react with magnesium with very good yields when the reaction is carried out in a cyclic ether, e.g. tetrahydrofuran or tetrahydropyran or their homologues. Magnesium derivatives of the compounds of Formula II may also be prepared in these same solvents.

Further, unsaturated halogenated organic derivatives of types I and II readily react with magnesium when the reaction medium employed is a polyethylene glycol diether.

Although the variety of solvents which can thus be used is fairly wide and in turn renders possible a wider industrial application of the organomagnesium compounds, there are applications for which the use of other solvents appears desirable. Thus, questions of solubility or of convenience of recovery may make it desirable to use, depending upon circumstances, either simple ethers of the aliphatic series, such as diethyl ether, diisopropyl ether, and normal butyl ether, or aromatic ethers such as anisole, or to have recourse to solvents such as the formals. Unfortunately, in this category of solvents, the halogenated derivatives of types I and II do not react with magnesium, or react to a limited degree, even in the presence of iodine, and mediocre yields are consequently obtained.

According to the present invention there is provided a process for the production of organomagnesium compounds which comprises reacting magnesium with a halogen derivative of an unsaturated organic compound in an inert atmosphere, wherein the reaction is initiated with a small portion of the said halogen derivative working in a primary solvent medium selected from cyclic ethers and polyethylene glycol diethers, the primary solvent medium is then replaced by or mixed with a secondary solvent medium selected from aliphatic monoethers, phenolic ethers and formals and the reaction is continued with the addition of the remainder of the said halogen derivative.

The change of solvent affords no particular difficulty. For example, the primary solvent may be siphoned away under inert gas, e.g. nitrogen, and the secondary solvent then added. Again, if the order of the boiling points permits, it is possible to add the secondary solvent and then to distil the primary solvent before the addition of the halogen derivative to the medium is continued. The organomagnesium compound may be precipitated more or less rapidly and more or less abundantly in the pure secondary solvent, depending upon the nature of the solvent, the nature of the halogen derivative employed and the proportion of solvent introduced. However, good results are generally obtained with good agitation and appropriate heating.

In another method of performing the invention, when the initial reaction in the primary solvent has been completed, the reaction is continued in a mixture of the primary solvent and the secondary solvent. It is thus generally possible to obtain completely homogeneous mixtures and to produce very good yields.

The primary solvents employed according to the present invention are cyclic ethers, such as tetrahydrofuran, tetrahydropyran and their homologues, and polyethylene glycol diethers of the formula:

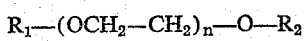

in which $R_1$ and $R_2$ represent the same or different alkyl groups, preferably those containing from 2 to 4 carbon atoms, and $n$ is a whole number, preferably 2 or 3.

The secondary solvents employed according to the invention are the aliphatic monoethers, including those substituted by an aromatic group, the phenolic ethers, and the formals. The following ethers have been found particularly useful as secondary solvents in the process of the invention: diethyl ether, isopropyl ether, normal butyl ether, methyl-isopropyl ether, methyl-isoamyl ether, methyl-benzyl ether, anisole and methylal.

The halogen derivatives of unsaturated organic compounds used in the process of the invention may be compounds of types I and II above set forth.

The reaction is preferably carried out as with an ordinary Grignard reagent, that is to say, with a dry apparatus and with dry reactants, under a current of nitrogen, and may be performed in practice in the following manner. All the magnesium is covered by the primary solvent, which is chosen as a function of the subsequent operations, and there may be added an iodine crystal, followed by a small quantity of unsaturated halogenated compound in the form of a solution in a little of the same primary solvent. The mixture is slightly heated, if desired, to start the reaction. The primary solvent is thereafter replaced by the preferred secondary solvent for the remainder of the operations or, if it is preferred to work in a mixed solvent medium, the secondary solvent is simply mixed with the primary solvent. The addition of the halogenated derivative is then continued, the rate of the addition and if desired the heating being so adjusted that no violent reaction and no stoppage of the reaction occurs. The reaction proceeds normally at about 30–60° C. When all the reactant has been introduced, the heating is continued at a temperature of 80° C., or with reflux of the solvent if it boils at a temperature lower than 80° C., for a period of time varying in accordance with the circumstances. When the organomagnesium derivative formed is completely or almost soluble, this additional heating may be fairly short and may amount to about 30 minutes. Agitation generally promotes the performance of the process, especially when the magnesium derivative is sparingly soluble.

The following examples illustrate the invention, but are not to be regarded as limiting it in any way. They illustrate the simplicity of the process and the advantages thereof in terms of the yields obtained in the subsequent condensation of the products with derivatives capable of reacting with magnesium compounds.

*Example I*

To 0.2 gram-atom of magnesium are added 10 cc. of anhydrous tetrahydrofuran and a trace of iodine, followed by several drops of 1-bromopropene. When the reaction is established and, after decoloration, the brown coloration of the organomagnesium compound has occurred, the tetrahydrofuran is siphoned away under a current of dry nitrogen. Thereafter, 30 cc. of diethyl ether are introduced, and then, progressively, 0.2 gram-mol. of 1-bromopropene diluted in 30 cc. of diethyl ether. The temperature is regulated from the beginning to the end of the addition of the 1-bromopropene in such manner that there is no stoppage and no over-heating. When this addition is complete, heating is continued for 50 minutes, the ether being refluxed.

The magnesium derivative obtaind may thereafter be condensed with 0.15 gram-mol. of heptyl aldehyde to give hexyl 1-propenyl carbinol. The carbinol yield is 72% of the theory calculated on the heptyl aldehyde.

By proceeding in the same manner with 1-bromopropene in the various solvents which can be used by this new technique, and thereafter reacting the magnesium derivative obtained either with acetone or with heptyl aldehyde (oenanthol), the results given in the following table are obtained:

| Secondary solvent employed | Aldehyde or ketone employed | Carbinol obtained | Carbinol yields calculated on aldehyde or ketone, percent |
|---|---|---|---|
| iso—$C_5H_{11}$—O—$CH_3$ | $C_6H_{13}CHO$ | $CH_3$—CH=CH\CHOH/$C_6H_{13}$ | 72 |
| $C_6H_5$—$CH_2$—O—$CH_3$ | $C_6H_{13}CHO$ | $CH_3$—CH=CH\CHOH/$C_6H_{13}$ | 72 |
| $CH_3$\CH—O—$CH_3$/$CH_3$ | $C_6H_{13}CHO$ | $CH_3$—CH=CH\CHOH/$C_6H_{13}$ | 70-75 |
| Di-n-butyl ether | $C_6H_{13}CHO$ | $CH_3$—CH=CH\CHOH/$C_6H_{13}$ | 69 |
| Di-isopropyl ether | $C_6H_{13}CHO$ | $CH_3$—CH=CH\CHOH/$C_6H_{13}$ | 55 |
| Methylal | $C_6H_{13}CHO$ | $CH_3$—CH=CH\CHOH/$C_6H_{13}$ | 72 |
| Mixture anisole (3 volumes)/ diethyl ether (1 volume). | $C_6H_{13}CHO$ | $CH_3$—CH=CH\CHOH/$C_6H_{13}$ | 72 |
| Mixture of diethyl ether (1 volume)/tetrahydrofuran (1 volume). | acetone | $CH_3$—CH=CH—$\overset{CH_3}{\underset{CH_3}{C}}$—OH | 76 |

*Example II*

By proceeding as in Example I with ethoxybromopropenes, the following results are obtained:

| Derivative of the type \C=CHX/ | Reactant condensed with the magnesium derivative | Product obtained | Yield, percent |
|---|---|---|---|
| $C_2H_5.O$—$CH_2$—CH=CHBr | $C_6H_{13}CHO$ | $C_2H_5.O$—$CH_2$—CH=CH—CHOH—$C_6H_{13}$ | 25 |
| $C_2H_5.O$—$CH_2$—$\underset{CH_3}{C}$=CHBr | $CH_3$—CO—$C_2H_5$ | $C_2H_5.O$—$CH_2$—C=CH—$C\overset{CH_3}{\underset{C_2H_5}{}}$$\underset{OH}{}$ $\underset{CH_3}{}$ | 43 |

*Example III*

The procedure of Example I is followed using as the primary solvent medium the diethyl ether of diethylene glycol or the di-n-butyl ether of diethylene glycol and using diethyl ether as the secondary solvent medium, the reactants and yields being indicated in the following table:

| Derivative of the type $\diagdown$C=CHX$\diagup$ | Reactant condensed with the magnesium derivative | Product obtained | Yield, percent |
|---|---|---|---|
| A. PRIMARY SOLVENT: DIETHYL ETHER OF DIETHYLENE GLYCOL ||||
| CH₃—CH=CHBr | C₇H₁₅CHO | C₇H₁₅CHOH—CH=CH—CH₃ | 74 |
| CH₃—CH=CHBr | CH₃—CO—CH₃ | CH₃—CH=CH—C(CH₃)(OH)(CH₃) | 86 |
| Et—O—CH₂—CH=CHBr | CH₃—CO—CH₃ | Et—O—CH₂—CH=CH—C(CH₃)(OH)(CH₃) | 34 |
| Et—O—CH₂—C(CH₃)=CHBr | CH₃—COCH₃ | Et—O—CH₂—C(CH₃)=CH—C(CH₃)(OH)(CH₃) | 20 |
| 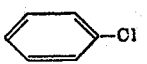 phenyl-Cl | H₂O | C₆H₆ | 70 |
| 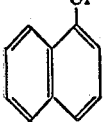 naphthyl-Cl | H₂O | 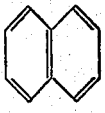 naphthalene | 75 |
| (CH₃)₂CH—C₆H₄—Cl | ClCH₂—CH=CH₂ | (CH₃)₂CH—C₆H₄—CH₂CH=CH₂ | 75 |
| C₆H₅—C(CH₃)=CHBr | H₂O | C₆H₅—C(CH₃)=CH₂ | 75 |
| B. PRIMARY SOLVENT: DI-n-BUTYL ETHER OF DIETHYLENE GLYCOL ||||
| CH₃—CH=CHBr | CH₃—CO—CH₃ | CH₃—CH=CH—C(CH₃)(OH)(CH₃) | 80 |

Example IV

The procedure of Example I is followed, but the 1-bromopropene is replaced by 1-bromo-2-n-butyl acetylene. The hexynyl magnesium bromide obtained, condensed with 0.15 gram-mol. of ethanol, gives methyl(1-hexynyl)-carbinol in a yield of 85% calculated on the ethanol. This carbinol distils at 81–82° C. under a pressure of 11 mm. of mercury.

Example V

Using 1-bromo-2-n-butyl acetylene (0.2 gram-mol.) as in Example IV but employing as the primary solvent the diethyl ether of diethylene glycol and displacing this with diethyl ether as the secondary solvent, there is obtained hexynyl magnesium bromide which, condensed with 0.15 gram-mol. of acetaldehyde gives methyl (1-hexynyl) carbinol in a yield of 80% calculated on the acetaldehyde.

Example VI

By proceeding as in Example V but using 1-bromo-2-phenyl acetylene and condensing the phenyl ethynyl magnesium bromide with butyraldehyde, there is obtained propyl (2-phenyl-1-ethynyl)-carbinol in a yield of 75% based on the butyraldehyde.

Example VII

By proceeding as in Example V but using as the primary solvent the di-n-butyl ether of diethylene glycol, there is obtained methyl(1-hexynyl)-carbinol in a yield of 78% based on the acetaldehyde.

Example VIII

By proceeding as in Example VI but using as the primary solvent the di-n-butyl ether of diethylene glycol, there is obtained propyl(2-phenyl-1-ethynyl)-carbinol in a yield of 70% based on the butyraldehyde.

I claim:

1. A process for the production of organomagnesium compounds which comprises reacting magnesium with a halogen derivative of an unsaturated organic compound containing a grouping selected from the class consisting of the groupings

and —C≡C—X where X is a halogen atom, in an inert atmosphere, wherein the reaction is initiated with a small portion of the said halogen derivative working in a primary solvent medium selected from the class consisting of cyclic ethers and polyethylene glycol diethers, and the reaction is continued, with the addition of the remainder of the said halogen derivative, in the presence of a secondary solvent medium selected from the class consisting of aliphatic monoethers, phenolic ethers and formals.

2. A process for the production of organomagnesium compounds which comprises reacting magnesium with a halogen derivative of an unsaturated organic compound containing a grouping selected from the class consisting of the groupings

and —C≡C—X where X is a halogen atom, in an inert atmosphere, wherein the reaction is initiated with a small portion of the said halogen derivative working in a primary solvent medium selected from the class consisting of cyclic ethers and polyethylene glycol diethers, and the reaction is continued, with the addition of the remainder of the said halogen derivative, in the presence of a secondary solvent medium selected from the class consisting of aliphatic monoethers, phenolic ethers and formals, the said secondary solvent medium substantially wholly replacing the said primary solvent medium.

3. A process for the production of organomagnesium compounds which comprises reacting magnesium with a halogen derivative of an unsaturated organic compound containing a grouping selected from the class consisting of the groupings

and —C≡C—X where X is a halogen atom, in an inert atmosphere, wherein the reaction is initiated with a small portion of the said halogen derivative working in a primary solvent medium selected from the class consisting of cyclic ethers and polyethylene glycol diethers, and the reaction is continued, with the addition of the remainder of the said halogen derivative, in the presence of a secondary solvent medium selected from the class consisting of aliphatic monoethers, phenolic ethers and formals, the said secondary solvent medium being added to the said primary solvent medium.

References Cited in the file of this patent
UNITED STATES PATENTS

| | | |
|---|---|---|
| 2,054,303 | Scott | Sept. 15, 1936 |
| 2,734,091 | Londergan | Feb. 7, 1956 |
| 2,838,508 | Ramsden | June 10, 1958 |
| 2,855,397 | Ramsden | Oct. 7, 1958 |
| 2,872,471 | Ramsden et al. | Feb. 3, 1959 |

OTHER REFERENCES

Kharasch et al.: "Grignard Reactions of Nonmetallic Substances," Prentice Hall, 1945, pp. 29–30 and 45–49 relied on.